United States Patent [19]
Yagihashi

[11] Patent Number: 5,648,755
[45] Date of Patent: Jul. 15, 1997

[54] DISPLAY SYSTEM

[75] Inventor: Wataru Yagihashi, Kanagawa Pref., Japan

[73] Assignee: Nissan Motor Co., Ltd., Yokohama, Japan

[21] Appl. No.: 368,201

[22] Filed: Dec. 29, 1994

[30] Foreign Application Priority Data

Dec. 29, 1993 [JP] Japan ............... 5-354612

[51] Int. Cl.⁶ ............... B60Q 1/00; G08B 25/00
[52] U.S. Cl. ............... 340/439; 340/438; 340/461; 340/525; 364/424.098
[58] Field of Search ............... 340/439, 438, 340/459–462, 525, 576, 522; 364/424.03, 188, 424.01

[56] References Cited

U.S. PATENT DOCUMENTS

| | | | |
|---|---|---|---|
| 4,633,216 | 12/1986 | Tsuyama | 340/462 |
| 5,017,916 | 5/1991 | Lonolt et al. | 340/461 |
| 5,072,391 | 12/1991 | Abe | 364/424.03 |
| 5,327,117 | 7/1994 | Kohsaka | 340/461 |
| 5,488,353 | 1/1996 | Kawakami et al. | 340/576 |

FOREIGN PATENT DOCUMENTS 55-29713  3/1980  Japan .

*Primary Examiner*—Donnie L. Crosland
*Attorney, Agent, or Firm*—Lowe, Price, LeBlanc & Becker

[57] ABSTRACT

Instantaneous state of a driver and instantaneous state of an automotive vehicle are identified based on sensed information related to the vehicle. Based on the identified instantaneous states in combination or in singular, one of predetermined indication modes is selected and pieces of information specified by the selected indication mode is displayed on a screen of a display unit.

11 Claims, 7 Drawing Sheets

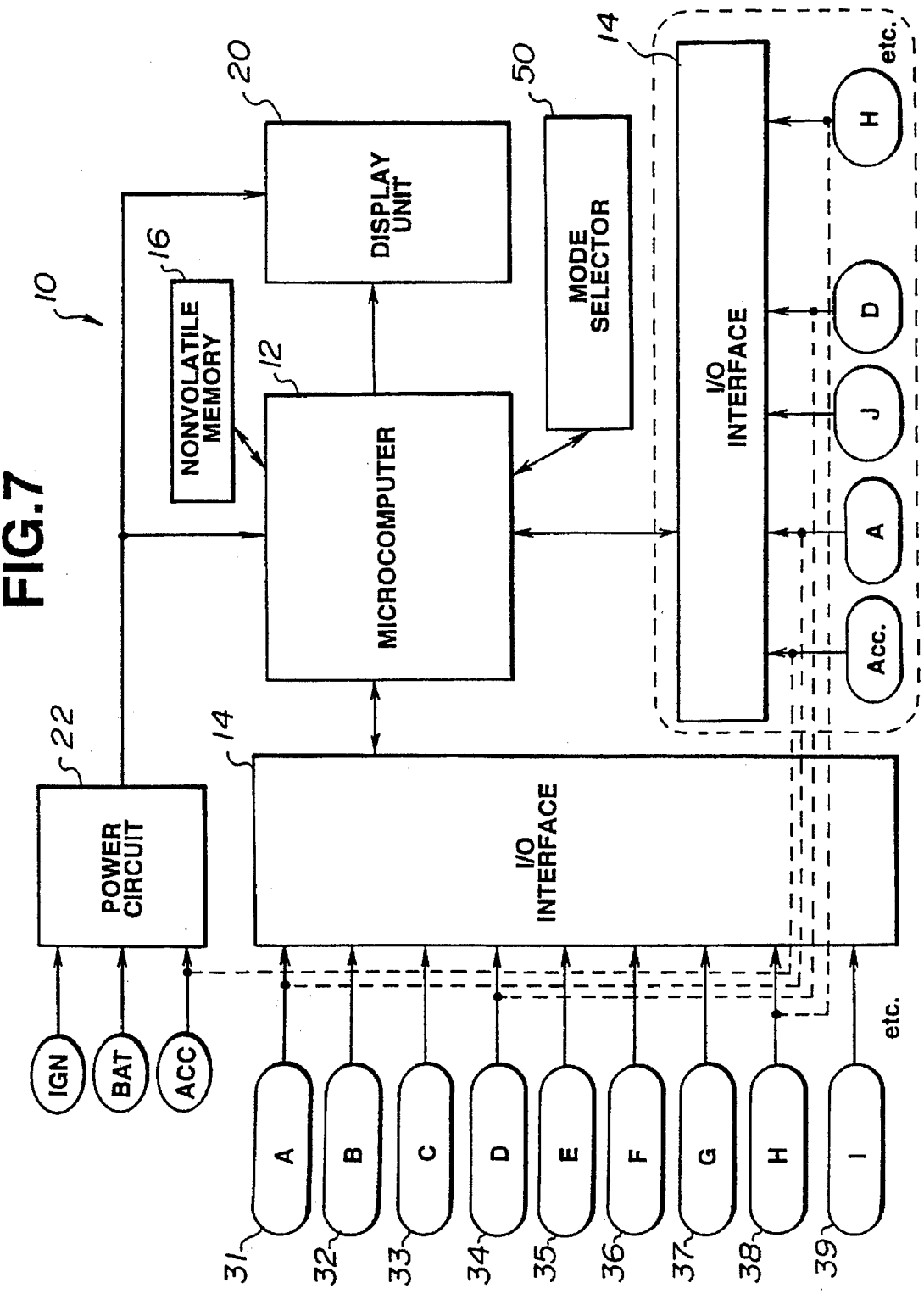

DISPLAY SYSTEM

BACKGROUND OF THE INVENTION

This invention relates to a display system for an automotive vehicle and more particularly to a system for giving a driver of an automotive vehicle information related to the automotive vehicle.

Japanese Patent Application Kokai (JP-A) 55-29713 discloses a display system for an automotive vehicle. According to this known display system, various meters, indicators and items monitored are displayed on a screen. The items monitored are displayed at all times in a predetermined order of arrangement. If an alarm is to be produced on one of the items, the item to be alarmed is shifted to a position given the highest priority and lighted intermittently. If alarm is to be produced on a plurality, not all, of items monitored, they are shifted to positions given higher priorities and arranged in a predetermined order of arrangement determined based on degrees of emergency assigned to them, and lighted intermittently.

With this display system, items to be alarmed are displayed in a predetermined order of arrangement which, however, is unaltered against a change in state of the automotive vehicle and a change in state of its driver. Thus, there occur situations where indications given by this known display system fail to receive prompt and timely attention by the driver.

SUMMARY OF THE INVENTION

It is a main object of this invention to provide a display system which is so improved as to display indications in such a manner as to select and give information which is important and needed to be promptly and timely attended by a driver of an automotive vehicle.

According to the present invention, there is provided a display system for use with an automotive vehicle, comprising:

a display unit having a predetermined area;

sensor means for sensing information related to the automotive vehicle; and a control unit operatively connected to said sensor means and said display unit, the control unit being operative to select one of a plurality of predetermined situations in which the driver of the automotive vehicle is involved based on the sensed information;

the control unit having stored therein a plurality of predetermined indication modes which specify different combinations of scales on which all indicators are displayed within said predetermined area, respectively, the plurality of predetermined indication modes corresponding to the plurality of predetermined situations in which the driver of the automotive vehicle may be involved such that if one of the plurality of predetermined situations is selected, only those indicators which the driver needs or should recognize in the one selected situation are displayed on larger scale than the other indicators in the corresponding one of the plurality of predetermined indication modes, and the control unit being operative to cause the display to display all of the indicators in accordance with what is specified by the corresponding indication mode to the selected situation in which the driver is involved.

BRIEF DESCRIPTION OF THE DRAWINGS

The present invention will be described in greater detail by reference to the following description taken in connection with the accompanying drawings, in which:

FIG. 7 is a schematic diagram showing a modified form of a display system.

DETAILED DESCRIPTION OF THE INVENTION

Figure 1:
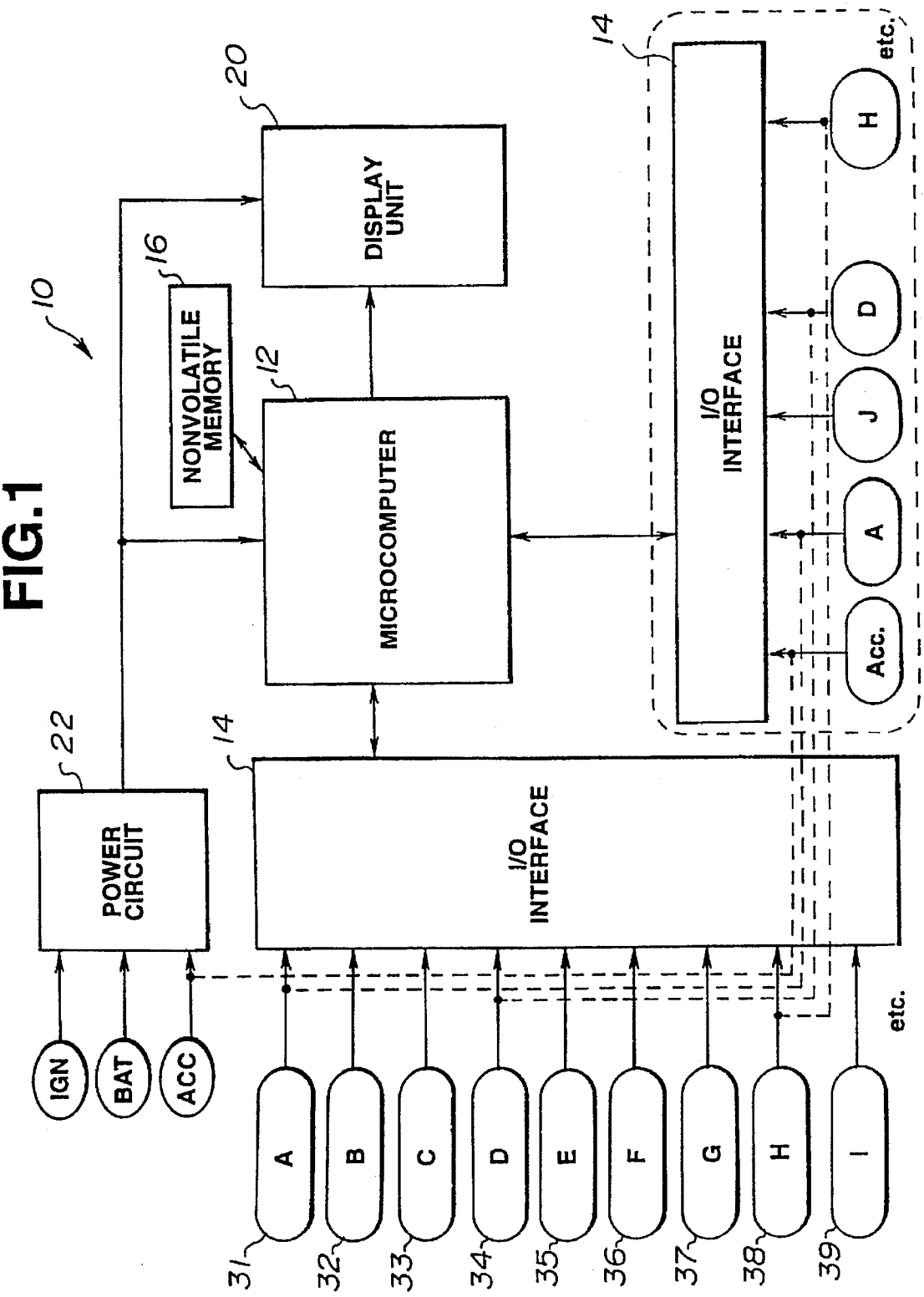
FIG. 1 is a schematic diagram showing one embodiment of a display system according to the present invention.
Figure 2:
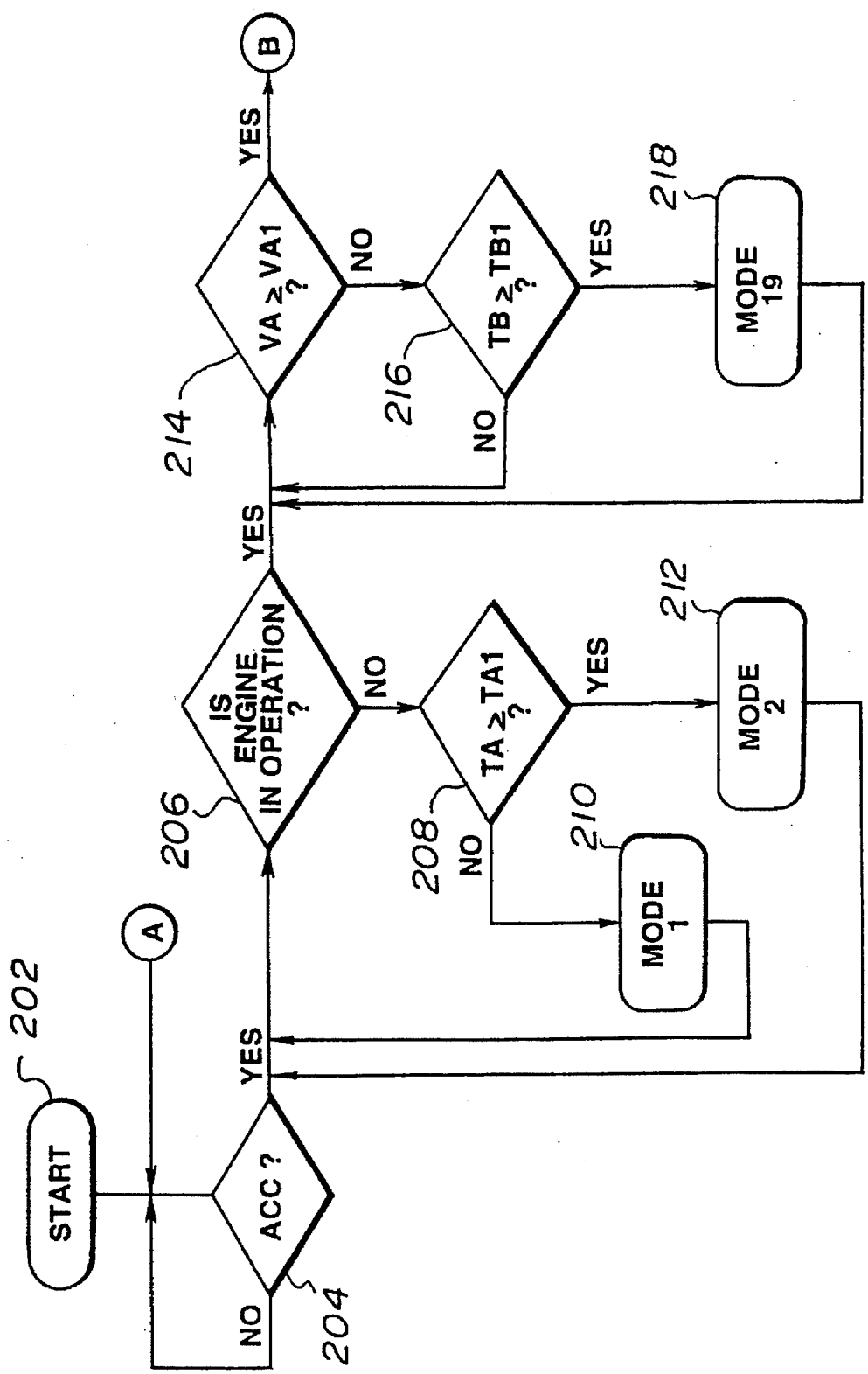
FIGS. 2 to 5 are flow diagrams illustrating the programming of the digital computer as it is used to select a desired one of predetermined indication modes.
Figure 3:
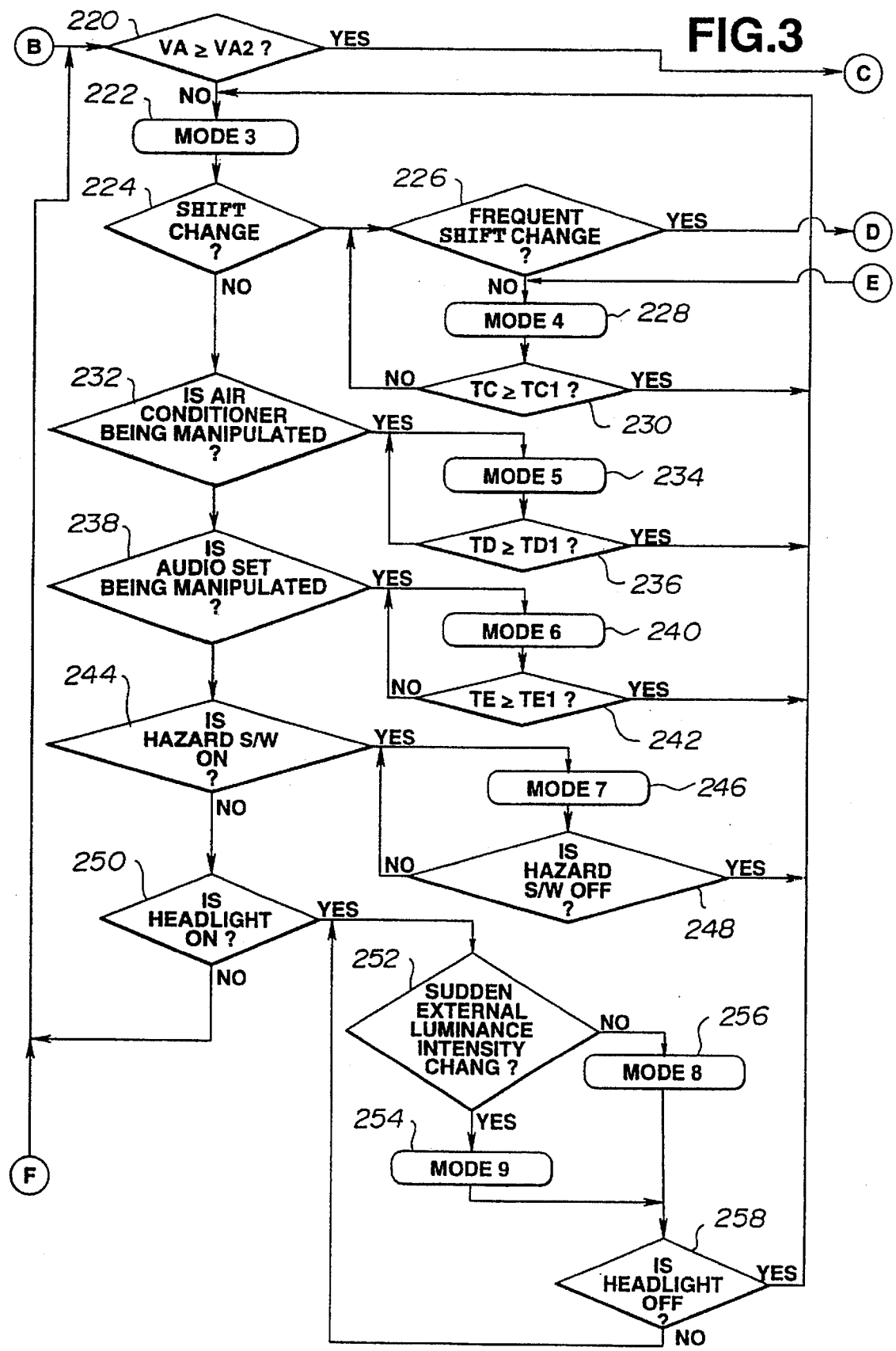
Figure 4:
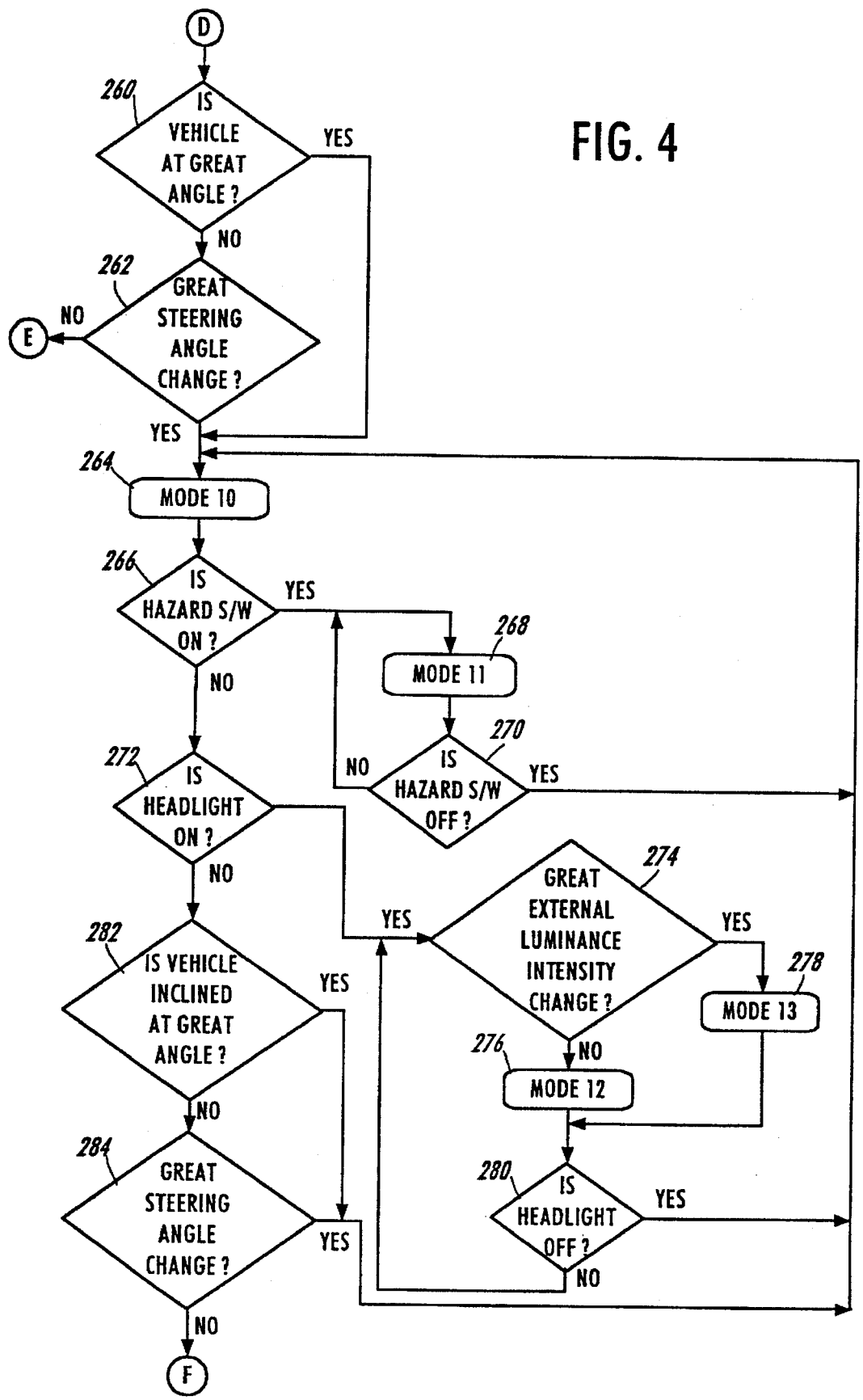
Figure 5:
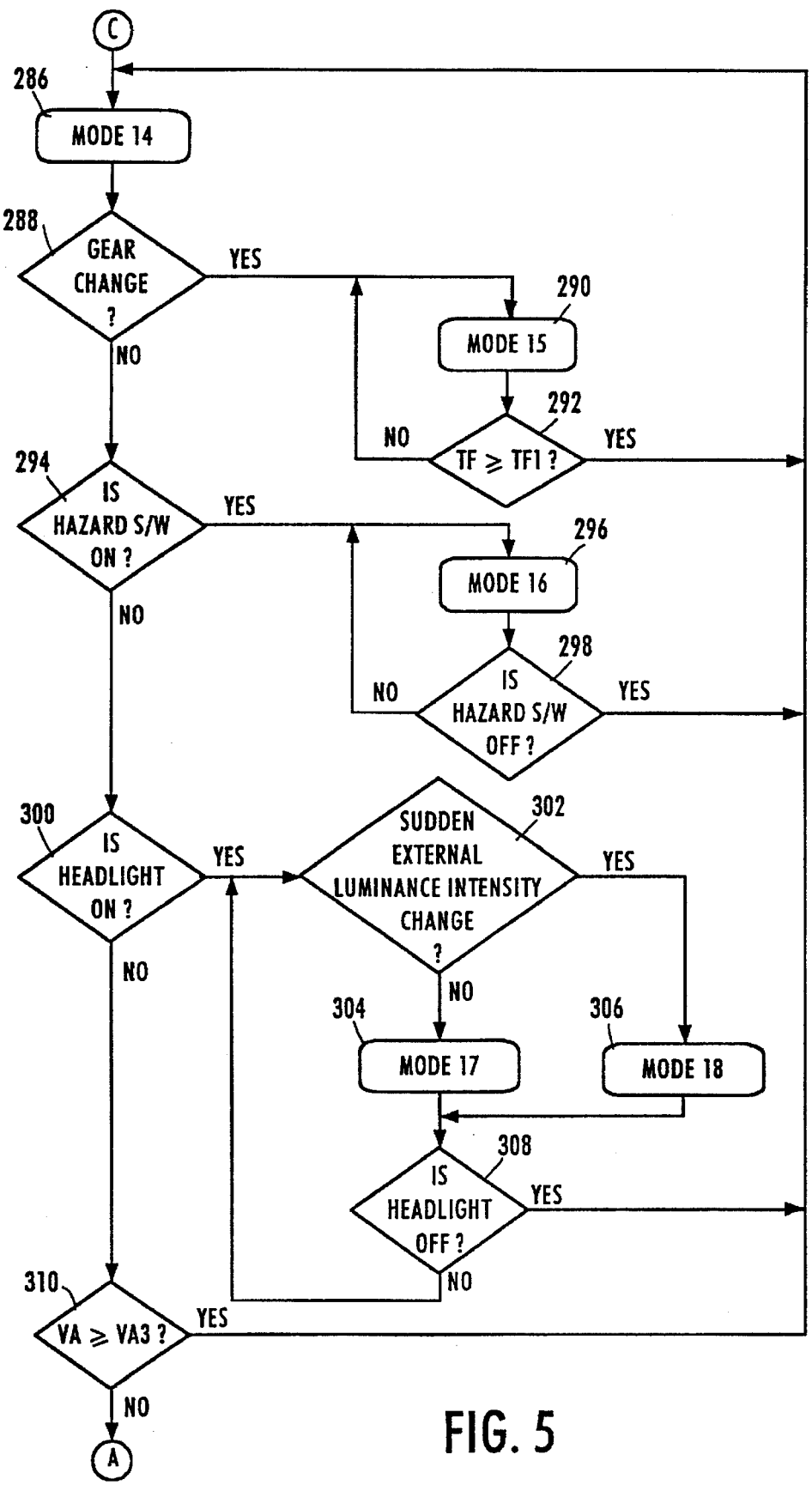

With reference to the drawings and in particular to FIG. 1, there is shown a schematic diagram of a display system. The display system, generally designated by the numeral 10, for an automotive vehicle, includes a control unit which identifies instantaneous state of a driver of an automotive vehicle and instantaneous state of the automotive vehicle, selects appropriate one of predetermined various indication modes based on the identified one or combination of states, and indicates necessary pieces of information related to the vehicle in the selected indication mode on a display unit 20. The display unit 20 may be of the type employing a cathode ray tube (CRT) display, a liquid crystal or the like. The control unit includes a microcomputer 12, an input/output interface 14 and a nonvolatile memory 16. The microcomputer 12 communicates with the rest of the control unit via data bus. The microcomputer 12 is powered, along with the display unit by a vehicle mounted power source in the form of a battery 22.

The pieces of information to be indicated on the display unit 20 include vehicle speed, engine speed, engine coolant temperature, transmission shift position, unworn sheet belt state, unclosed door state, brake mode, audio set mode, air conditioner mode, etc. Thus, a vehicle speed sensor (A) 31, an engine speed sensor (B) 32, a coolant temperature sensor (C) 33, a transmission shift position sensor (D) 34, an unworn seat belt alarm sensor (E) 35, an unclosed door alarm sensor (F) 36, a brake alarm sensor (G) 37, an audio set mode sensor (H) 38, an air conditioner mode sensor (I) 39, etc., are connected to the input/output interface 14. The vehicle speed sensor 31 is provided to produce a signal indicative of the speed of the vehicle. The engine speed sensor 32 is provided to produce a signal indicative of the speed of rotation of the engine. The engine coolant temperature sensor 33 is preferrably mounted in the engine cooling system and comprises a thermistor connected in an electrical circuit capable of producing a voltage signal having a variable level proportional to engine coolant temperature. The transmission shift position sensor 34 is associated with the transmission shift lever to produce a signal indicative of the shift position at which the shift lever is placed. The unworn seat belt alarm sensor 35 is provided to produce an alarm signal when the seat occupant does not wear the seat belt. The unclosed door alarm sensor 36 is provided to produce an alarm signal when any vehicle door is not closed. The brake alarm sensor 37 is provided to produce an alarm signal when the side or hand operated brake is not applied or the brake fluid level is below a predetermined vaslue. The audio set mode sensor 38 is provided to produce a signal indicative of the mode of operation of the audio set mounted in the vehicle passenger compartment. The air conditioner mode sensor 39 is provided to produce a signal indicative of the mode of operation of the air conditioner installed in the vehicle passenger compartment. The microcomputer 12 may employ information including headlight mode, residual fuel amount, boost pressure, oil pressure, etc.

The sensed information used in selecting one of the indication modes include a piece of information whether an accessory circuit (Acc) is closed, a piece of information how frequently the steering angle has changed, a piece of information how frequently the transmission shift position has changed, a piece of information whether the audio set is being manipulated.

The microcomputer 12 identifies a combination of instantaneous state of a driver of the automotive vehicle with instantaneous state of the automotive vehicle based on the pieces of information just mentioned, and selects one of predetermined indication modes from a table programmed therein. The table specifies an indication mode as a function of the identified combination. The display unit 20 operates on command from the microcomputer 12 to make indications thereon in the selected mode. For example, the indications may include a vehicle speed meter, a tachometer, fuel gauge, a boost pressure gauge, a turn direction indicator, a shift position indicator, a heat or temperature indicator, an oil pressure gauge, a battery voltmeter, an unclosed door alarm, a headlight indicator, an O/D (overdrive) indicator, an ABS (Anti-skid Brake System) indicator, an ASCD (Auto Speed Control Device) indicator, a brake alarm, a watch, an air conditioner indicator and an audio set indicator.

In this embodiment, nineteen (19) indication modes are predetermined and stored in a read only memory (ROM) of or associated with the microcomputer 12. These modes are listed in the following TABLES 1 to 4 where the mark ○ indicates an indication made on a normal scale, the mark ⊙ indicates an indication made on a larger scale, the mark △ indicates an indication made on a smaller scale, and the mark ★ indicates an indication made with light in the event of failure:

Brief explanaion is made as to instantaneous state of the driver and instantaneous state of the vehicle which modes 1 to 19 are intended to be used with.

Mode 1 is used when the driver has turned on the accessory circuit and is about to start the engine although the engine is not yet started while the vehicle is at rest. All pieces of information related to the automotive vehicle are indicated on normal scale in order for the driver to check all of the indications prior to start-up of the engine.

Mode 2 is used when, with the accessory circuit closed, the driver or passenger is cleaning the vehicle or filling the fuel tank, and the vehicle is at rest. The indications related to equipments only are made on the larger scale.

Mode 3 is used when the driver concentrates on driving and the vehicle is travelling through town area. All indications are made the normnal scale.

Mode 4 is used when the driver is busy in shifting the transmission and the vehicle is travelling through town area. The indication of the shift position is made on the larger scale as compared to the mode 3.

Mode 5 is used when the driver manipulates the air conditioner and the vehicle is travelling through town area. The indication of the air conditioner state is made on the larger scale as compared to the mode 3.

Mode 6 is used when the driver manipulates the audio set and the vehicle is travelling through town area. The indication of the state of the audio set manipulated is made on the larger scale as compared to the mode 3.

Mode 7 is used when the driver turns on the hazard switch in response to recognition of situation demanding slow down, such an accident, while the vehicle is travelling through town area. The indication of turn direction indicator is made on the larger scale as compared to the mode 3.

Mode 8 is used when the driver turns on headlamps and/or small lamps and the vehicle is travelling through town area. The indication of lightening of the lamps is made on the larger scale as compared to the mode 3.

Mode 9 is used when the driver gives concentrates on driving and the vehicle is passing through short tunnel. The indication of lightening of the lamps is made on the larger scale as compared to the mode 3.

From the preceding, it is now understand that the modes 4–9 are substantially similar to the mode 3 except the manner of indication mentioned as above.

Modes 10–13 are used when the vehicle is travelling through mountain area.

Mode 10 is used when the driver concentrates on driving and the vehicle is travelling through mountain area. In this situation, the driver needs to or should carefully monitor the state of the engine so that the indications of engine related information are made on the larger scale.

Mode 11 is used when the driver turns on the harzard switch while the vehicle is travelling through mountain area. The indication of the turn direction indicator is made on the larger scale than the mode 10.

Mode 12 is used when the driver turns on the headlamps and/or small lamps while the vehicle is travelling through mountain area. The indication of lightening of the lamps is made on the larger scale than the mode 10.

Mode 13 is used when the driver concentrates on driving and the vehicle passes through tunnel while travelling through mountain area, The indication of lightening of the lamps is made on the larger scale than the mode 10.

Modes 14–18 are used when the vehicle is travelling on highway.

Mode 14 is used when the driver concentrates on driving and the vehicle is travelling on highway. In this situation, the driver can afford to manipulating the equipments as compared to driving through town area so that the indications of equipments are made on the larger scale as compared to the mode 3.

Mode 15 is used when the driver changes the shift position while the vehicle is travelling on highway. The indication of the shift indicator is made on the larger scale as compared to the mode 14.

Mode 16 is used when the driver turns on the hazard switch while the vehicle is travelling on highway. The indication of the turn direction indicator is made on the larger scale as compared to the mode 14.

Mode 17 is used when the driver turns on the headlamp and/or small lamps and the vehicle is travelling on highway. The indication of lightening of the lamps is made on the largher scale than the mode 14.

Mode 18 is used when the driver concentrates on driving upon passing through long tunnel while travelling on highway. The indication of fuel gauge is made on the normal scale and the indication of boost pressure gauge is made on the smaller scale as compared to the mode 17.

Mode 19 is used when the driver can afford to manipulate the equipments and the vehicle is involved in traffic jam. In this situtation, the indications of equipments are made on the larger scale.

TABLE 1

| MODE No. | 1 | 2 | 3 | 4 | 5 |
|---|---|---|---|---|---|
| VEHICLE SPEED METER | ○ | — | ○ | ○ | ○ |
| TACHOMETER | ○ | — | ○ | ○ | ○ |
| FUEL GAUGE | ◎ | — | ○ | ○ | ○ |
| BOOST PRESSURE GAUGE | △ | — | ○ | ○ | ○ |
| TURN DIRECTION INDICATOR | ○ | — | ○ | ○ | ○ |
| SHIFT POSITION INDICATOR | ○ | — | ○ | ◎ | ○ |
| HEAT INDICATOR | ○ | — | ★ | ★ | ★ |
| OIL PRESSURE GAUGE | ○ | — | ★ | ★ | ★ |
| VOLTMETER | ○ | — | ★ | ★ | ★ |
| UNCLOSED DOOR ALARM | ◎ | — | ○ | ○ | ○ |
| HEADLIGHT INDICATOR | ○ | — | ○ | ○ | ○ |
| O/D INDICATOR | ○ | — | ○ | ○ | ○ |
| ABS INDICATOR | ○ | — | ○ | ○ | ○ |
| ASCD INDICATOR | ○ | — | ○ | ○ | ○ |
| BRAKE ALARM | ◎ | — | ○ | ○ | ○ |
| WATCH | ◎ | ◎ | ○ | ○ | △ |
| AIR CON. INDICATOR | ◎ | ◎ | ○ | ○ | ◎ |
| AUDIO SET INDICATOR | ◎ | ◎ | ○ | ○ | △ |

TABLE 2

| MODE No. | 6 | 7 | 8 | 9 | 10 |
|---|---|---|---|---|---|
| VEHICLE SPEED METER | ○ | ○ | ○ | ○ | ○ |
| TACHOMETER | ○ | ○ | ○ | ○ | ◎ |
| FUEL GAUGE | ○ | ○ | ○ | △ | ○ |
| BOOST PRESSURE GAUGE | ○ | ○ | ○ | △ | ◎ |
| TURN DIRECTION INDICATOR | ○ | ◎ | ○ | ○ | ○ |
| SHIFT POSITION INDICATOR | ○ | ○ | ○ | ○ | ◎ |
| HEAT INDICATOR | ★ | ★ | ★ | ★ | ★ |
| OIL PRESSURE GAUGE | ★ | ★ | ★ | ★ | ★ |
| VOLTMETER | ★ | ★ | ★ | ★ | ★ |
| UNCLOSED DOOR ALARM | ○ | ○ | ○ | △ | △ |
| HEADLIGHT INDICATOR | ○ | ○ | ◎ | ◎ | ○ |
| O/D INDICATOR | ○ | ○ | ○ | ○ | ○ |
| ABS INDICATOR | ○ | ○ | ○ | △ | ○ |
| ASCD INDICATOR | ○ | ○ | ○ | △ | △ |
| BRAKE ALARM | ○ | ○ | ○ | ○ | ◎ |
| WATCH | △ | ○ | ○ | ○ | ○ |
| AIR CON. INDICATOR | △ | ○ | ○ | ○ | ○ |
| AUDIO SET INDICATOR | ◎ | ○ | △ | ○ | ○ |

TABLE 3

| MODE No. | 11 | 12 | 13 | 14 | 15 |
|---|---|---|---|---|---|
| VEHICLE SPEED METER | ○ | ○ | ○ | ◎ | ◎ |
| TACHOMETER | ◎ | ◎ | ◎ | ○ | ○ |
| FUEL GAUGE | ○ | ○ | △ | ◎ | ◎ |
| BOOST PRESSURE GAUGE | ◎ | ◎ | △ | ○ | ○ |
| TURN DIRECTION INDICATOR | ◎ | ○ | ○ | ○ | ○ |
| SHIFT POSITION INDICATOR | ◎ | ◎ | ◎ | ○ | ◎ |
| HEAT INDICATOR | ★ | ★ | ★ | ★ | ★ |
| OIL PRESSURE GAUGE | ★ | ★ | ★ | ★ | ★ |
| VOLTMETER | ★ | ★ | ★ | ★ | ★ |
| UNCLOSED DOOR ALARM | △ | △ | △ | △ | △ |
| HEADLIGHT INDICATOR | ○ | ◎ | ◎ | ○ | ○ |
| O/D INDICATOR | ○ | ○ | ○ | △ | ○ |
| ABS INDICATOR | ○ | ○ | ○ | △ | ○ |
| ASCD INDICATOR | △ | △ | △ | ◎ | ◎ |
| BRAKE ALARM | ◎ | ◎ | ◎ | ○ | ○ |
| WATCH | ○ | ○ | ○ | ○ | ○ |
| AIR CON. INDICATOR | ○ | ○ | ○ | ◎ | ◎ |
| AUDIO SET INDICATOR | ○ | ○ | ○ | ◎ | ◎ |

TABLE 4

| MODE No. | 16 | 17 | 18 | 19 |
|---|---|---|---|---|
| VEHICLE SPEED METER | ◎ | ◎ | ◎ | △ |
| TACHOMETER | ○ | ○ | ○ | △ |
| FUEL GAUGE | ◎ | ◎ | ○ | ◎ |
| BOOST PRESSURE GAUGE | ○ | ○ | △ | △ |
| TURN DIRECTION INDICATOR | ◎ | ○ | ○ | △ |
| SHIFT POSITION INDICATOR | ○ | ○ | ○ | ○ |
| HEAT INDICATOR | ★ | ★ | ★ | ★ |
| OIL PRESSURE GAUGE | ★ | ★ | ★ | ★ |
| VOLTMETER | ★ | ★ | ★ | ★ |
| UNCLOSED DOOR ALARM | △ | △ | △ | ○ |
| HEADLIGHT INDICATOR | ○ | ◎ | ◎ | ○ |
| O/D INDICATOR | ○ | ○ | ○ | △ |
| ABS INDICATOR | ○ | ○ | ○ | △ |
| ASCD INDICATOR | ◎ | ◎ | ◎ | △ |
| BRAKE ALARM | ◎ | ○ | ○ | ○ |
| WATCH | ○ | ○ | ○ | ◎ |
| AIR CON. INDICATOR | ◎ | ◎ | ◎ | ◎ |
| AUDIO SET INDICATOR | ◎ | ◎ | ◎ | ◎ |

FIGS. 2 to 5 are flow diagrams illustrating the programming of the microcomputer as it is used to select a desired one of the indication modes 1 to 19.

The computer program is entered at the point 202. At the point 204 in the program, a determination is made as to whether or not the accessory (Acc) circuit is closed. If the answer to this question is "yes", then the program proceeds to the point 206. Otherwise, the program is returned to the point 202. At the point 206, a determination is made as to whether or not the engine is in operation. If the answer to this question is "yes", then the program proceeds to the point 214. Otherwise, the program proceeds to another determination step at the point 208. It is determined at the point 208 whether or not a predetermined time TA1 (for example, 180 seconds) has been elapsed after closing the Acc circuit. If the answer to this question is "no", then it is judged that the vehicle is at rest with the engine being starting and the program proceeds to the point 210 where the indication mode No. 1 is selected. The indication mode No. 1 is an indication check mode which permits the driver to check all of the indications. In this indication mode, the microcomputer 12 sets on the fuel gauge, the unclosed door alarm, the brake alarm, the watch, the air conditioner indicator and the audio set indicator and displays them on a large scale. The microcomputer 12 sets no importance on the boost pressure gauge and displays it on a small scale. Following this, the program is returned to the point 206. If the answer to the question inputted at the point 208 is "yes", then it is judged that the vehicle is being cleaned or supplied with fuel with some of the accessories being in operation and the program proceeds to the point 212 where the indication mode No. 2 is selected. The indication mode No. 2 is an accessory indication mode where the microcomputer 12 sets importance on the accessory indicators and displays them on a large scale. The other gauge and indicators are not displayed. Following this, the program is returned to the point 206.

At the point 214 in the program, a determination is made as to whether or not the vehicle is travelling at a predetermined speed VA1 (for example, 10 km/h) or more. For this determination, the microcomputer 12 utilizes the signal fed from the vehicle speed sensor 31. If the answer to this question is "yes", then the program proceeds to the point 220. Otherwise, the program proceeds to another determination step at the point 216. It is determined at the point 216 whether or not the time period TB during which the vehicle speed VA remains below the predetermined speed VA1 exceeds a predetermined time TB1 (for example, 180 seconds). If the answer to this question is "yes", then it is judged that a traffic snarl occurs and the frequency at which the driver operates the accessories increases and the program proceeds to the point 218 where the indication mode No. 19 is selected. The indication mode No. 19 is an accessory indication mode where the accessory indicators are displayed on a large scale. If the answer inputted at the point 216 is "no", then the program is returned to the point 214.

Figure 6A:
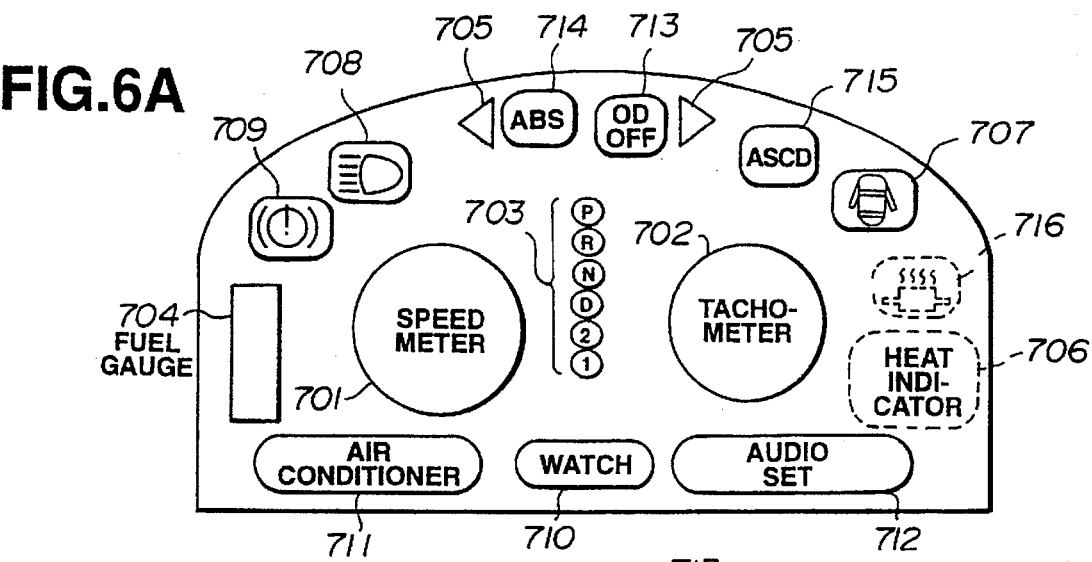
FIG. 6A is a schematic diagram showing one example of indications of information when a normal indication mode is selected.

At the point 220 in the program, a determination is made as to whether or not the vehicle is running at a predetermined speed VA2 (for example, 70 km/h) or more. If the answer to this question is "yes", then it is judged that the vehicle is travelling on a highway and the program proceeds to the point 286. Otherwise, it is judged that the vehicle is travelling in an urban distinct and the program proceeds to the point 222 where the indication mode No. 3 is selected. The indication mode No. 3 is a normal mode where all of the indications are made on a normal scale, as shown in FIG. 6A which indicates a vehicle speed meter 701, a tachometer 702, a gear position indicator 703, a fuel gauge 704, a turn direction indicator 705, a heat or temperature indicator 706, an unclosed door alarm 707, a headlight indicator 708, a brake alarm 709, a watch 710, an air conditioner indicator 71, an audio set indicator 712, an O/D indicator 713, an ABS indicator 714, an ASCD indicator 715 and an exhaust temperature alarm 716. The heat indicator, the oil pressure gauge and the battery voltmeter are indicated with light in the event of failure. Following this, the program proceeds to the point 224.

At the point 224 in the program, a determination is made as to whether or not a shift change is made in the transmission. If the answer to this question is "yes", then the program proceeds to another determination step at the point 226. This determination is as to whether or not frequent shift change is made. If the answer to this question is "yes", then the program proceeds to the point 260. Otherwise, it is judged that vehicle is travelling through town area and the program proceeds to the point 228 where the indication mode 4 is selected. The indication mode 4 is a gear change mode where the gear position indicator is displayed on a large scale. Following this, the program proceeds to the point 230 where a determination is made as to whether or not the time period TC during which the indication mode 4 is selected exceeds a predetermined value TC1 (for example, 20 seconds). If the answer to this question is "yes", then the program proceeds to the point 222 where mode 3 is selected. Otherwise, the program is returned to the point 226.

If the answer to the question inputted at the point 224 is "no", then the program proceeds to another determination step at the point 232. This determination is as to whether or not the air conditioner is being manipulated. If the answer to this question is "yes", then the program proceeds to the point 234 where the indication mode 5 is selected. The indication mode 5 is an air conditioner mode where the air conditioner indicator is displayed on a large scale. Following this, the program proceeds to the point 236 where a determination is made as to whether or not the time period TD during which the indication mode No. 5 is selected exceeds a predetermined value TD1 (for example, 20 seconds). If the answer to this question is "yes", then the program proceeds to the point 222 where the indication mode No. 3 is selected. Otherwise, the program is returned to the point 234.

If the answer to the question inputted at the point 232 is "no", then the program proceeds to another determination step at the point 238. This determination is as to whether or not the audio set is being manipulated. If the answer to this question is "yes", then the program proceeds to the point 240 where the indication mode No. 6 is selected. The indication mode No. 6 is an audio set mode where the audio set indicator is displayed on a large scale. Following this, the program proceeds to the point 242 where a determination is made as to whether or not the time period TE during which the indication mode 6 is selected exceeds a predetermined value TE1 (for example, 20 seconds). If the answer to this question is "yes", then the program is returned to the point 222 where the indication mode 3 is selected. Otherwise, the program is returned to the point 240.

If the answer to the question inputted at the point 238 is "no", then the program proceeds to another determination step at the point 244. It is determined at the point 222 whether or not the hazard switch is on. If the answer to this question is "yes", then it is indicated that a traffic jam or accident occurs and the program proceeds to the point 246 where the indication mode No. 7 is selected. The indication mode No. 7 is a hazard mode where the turn direction indicator is displayed on a large scale. Following this, the program proceeds to the point 248 where a determination is made as to whether or not the hazard switch is off. If the answer to this question is "yes", then the program proceeds to the point 222 where the indication mode No. 3 is selected. Otherwise, the program is returned to the point 246.

If the answer to the question inputted at the point 244 is "no", then the program proceeds to another determination step at the point 250. This determination is as to whether or not the headlight is switched on. If the answer to this question is "yes", then the program proceeds to the point 252. Otherwise, the program is returned to the point 220. At the point 252, a determination is made as to whether or not a sudden change occurs in the external luminance intensity sensed by a photo diode or the like. If the answer to this question is "yes", then it is judged that the vehicle is travelling through a tunnel and the program proceeds to the point 254 where the indication mode 9 is selected. The indication mode 9 is a tunnel mode where the headlight indicator is displayed on a large scale. Following this, the program proceeds to the point 258. If the answer to the question inputted at the point 252 is "no", then it is judged that the vehicle is travelling through town area in the night and the program proceeds to the point 256 where the indication mode 8 is selected. The indication mode 8 is a headlight mode where the headlight indicator is displayed on a large scale. Following this, the program proceeds to the point 258. At the point 258 in the program, a determination is made as to whether or not the headlight is switched off. If the answer to this question is "yes", then the program proceeds to the point 222. Otherwise, the program is returned to the point 252. For example, in the night, the headlight may be switched on three seconds after the external luminance intensity decreases below 70 luces and switched off three times after the external luminance intensity exceeds 300 luces. When the vehicle is travelling in a tunnel, the headlight may be switched on immediately when the external luminance intensity decreases below 30 luces and switched off immediately when the external luminance intensity increases above 100 luces.

Figure 6B:
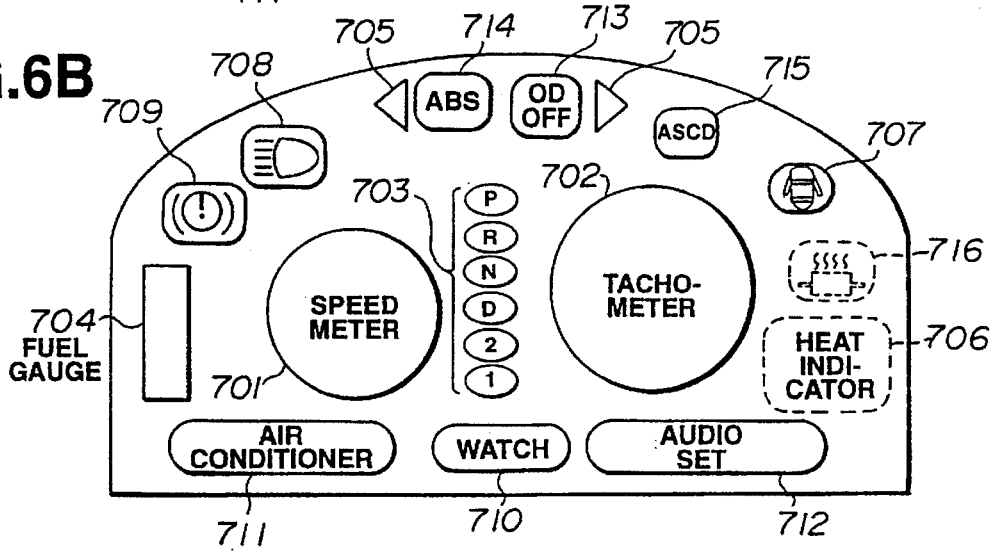
FIG. 6B is a schematic diagram showing one example of indications of information made when a mounting indication mode is selected.

At the point 260 in the program, a determination is made as to whether or not the vehicle is inclined at a great angle. If the answer to this question is "yes", then it is judged that the vehicle is going up and down a mountain and the program proceeds to the point 264 where the indication mode 10 is selected. The indication mode No. 10 is a mountain mode where the tachometer, the shift position indicator and the brake alarm are displayed on a large scale, as shown in FIG. 6B which indicates a vehicle speed meter 701, a tachometer 702, a shift position indicator 703, a fuel gauge 704, a turn direction indicator 705, a heat indicator 706, an unclosed door alarm 707, a headlight indicator 708, a brake alarm 709, a watch 710, an air conditioner indicator 711, an audio set indicator 712, an O/D indicator 713, an ABS indicator 714, and ASCD indicator 715 and an exhaust temperature alarm 716. The unclosed door alarm and the ASCD indicator are indicated on a small scale. Otherwise, the program proceeds to another determination step at the point 262. This determination is as to whether or not a great change is made in the steering angle. If the answer to this question is "yes", then it is judged that the vehicle is going up and down a mountain and the program proceeds to the point 264 where the indication mode No. 10 is selected. Otherwise, the program is returned to the point 228.

At the point 266 in the program, a determination is made as to whether or not the hazard switch is on. If the answer to this question is "yes", then it is judged that a traffic snarl or accident occurs and the program proceeds to the point 268 where the indication mode 11 is selected. The indication mode 11 is a hazard mode. Following this, the program proceeds to the point 270 where a determination is made as to whether or not the hazard switch is off. If the answer to this question is "yes", then the program is returned to the point 264. Otherwise, the program is returned to the point 268.

If the answer to the question inputted at the point 266 is "no", then the program proceeds to another determination step at the point 272. This determination is as to whether or not the headlight is switched on. If the answer to this question is "yes", then the program proceeds to the point 274 where a determination is made as to whether or not a great change occurs in the external luminance intensity. If the answer to this question is "yes", then it is judged that the vehicle is travelling through a tunnel on a mountain and the program proceeds to the point 278 where the indication mode 13 is selected. The indication mode 13 is a tunnel mode during mountain drive at night. Otherwise, it is judged that the vehicle is travelling on a mountain in the night and the program proceeds to the point 276 where the indication mode 12 is selected. The indication mode 12 is a headlight mode. At the point 280 in the program, a determination is made as to whether or not the headlight is switched off. If the answer to this question is "yes", then the program is returned to the point 264. Otherwise, the program is returned to the point 274.

If the answer to the question inputted a point 272 is "no", then the program proceeds to another determination step at the point 282. This determination is as to whether or not the vehicle is inclined at a great angle. If the answer to this question is "yes", then the program is returned to the point 264. Otherwise, the program proceeds to another determination step at the point 284. It is determined at the point 284 whether or not a great change is made in the steering angle. If the answer to this question is "yes", then the program is returned to the point 264. Otherwise, the program is returned to the point 220.

Figure 6C:
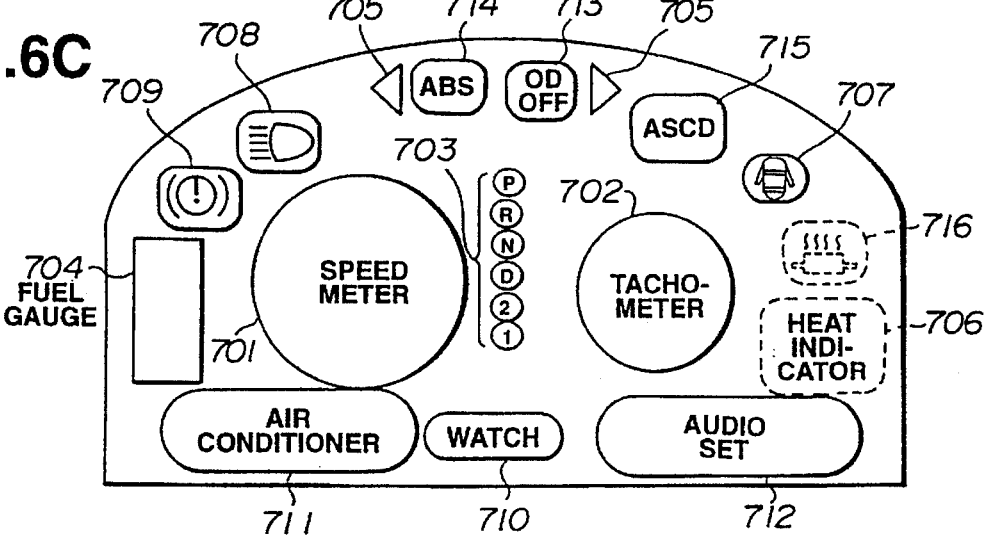
FIG. 6C is a schematic diagram showing one example of indications of information made when a highway indication mode is selected.

If the answer to the question at the point 220 is "yes", then it is judged that the vehicle is travelling on a highway and the program proceeds to the point 286. At the point 286 in the program, the indication mode 14 is selected. The indication mode 14 is a high-speed mode where the speed meter, the fuel gauge, the air conditioner indicator and the audio set indicator are displayed on a large scale, as shown in FIG. 6C which indicates a vehicle speed meter 701, a tachometer 702, a gear position indicator 703, a fuel gauge 704, a turn direction indicator 705, a heat indicator 706, an unclosed door alarm 707, a headlight indicator 708, a brake alarm 709, a watch 710, an air conditioner indicator 711, an audio set indicator 712, an O/D indicator 713, an ABS indicator 714, an ASCD indicator 715 and an exhaust temperature alarm 716. Following this the program proceeds to a determination step at the point 288. It is determined at the point 288 whether or not a shift change is made in the transmission. If the answer to this question is "yes", then the program proceeds to the point 290 where the indication mode No. 15 is selected. The indication mode 15 is a shift position mode during drive at high speed. Following this, the program proceeds to the point 292 where a determination is made as to whether or not the time period TF during which the indication mode 15 is selected exceeds a predetermined value TF1 (for example, 20 seconds). If the answer to this question is "yes", then the program is returned to the point 286. Otherwise, the program is returned to the point 290.

If the answer to the question inputted at the point 288 is "no", then the program proceeds to another determination step at the point 294. This determination is as to whether or not the hazard switch is on. If the answer to this question is "yes", then the program proceeds to the point 296 where the indication mode 16 is selected. The indication mode 16 is a hazard mode during drive at high speed. Following this, the program proceeds to the point 298 where a determination is made as to whether or not the hazard switch is off. If the answer to this question is "yes", then the program is returned to the point 286. Otherwise, the program is returned to the point 296.

If the answer to the question inputted at the point 294 is "no", then the program proceeds to another determination step at the point 300. It is determined at the point 300 whether or not the headlight is switched on. If the answer to this question is "yes", then the program proceeds to another determination step at the point 302. It is determined at the point 302 whether or not a sudden charge occurs in the external luminance intensity. If the answer to this question is "yes", then the program proceeds to the point 306 where the indication mode 18 is selected. The indication mode 18 is a tunnel mode during drive at high speed. Otherwise, the program proceeds to the point 304 where the indication mode 17 is selected. The indication mode 17 is a high speed drive mode in the night where importance is attached to the headlight indication. At the point 308 in the program, a determination is made as to whether or not the headlight is switched off. If the answer to this question is "yes", then the program is returned to the point 286. Otherwise, the program is returned to the point 302.

If the answer to the question inputted at the point 300 is "no", then the program proceeds to another determination step at the point 310. It is determined at the point 310 whether or not the vehicle speed VA is equal to or greater than a predetermined value VA3 (for example, 70 km/h). If the answer to this question is "yes", then the program is returned to the point 286. Otherwise, the program is returned to the point 204.

Referring to FIG. 7 there is shown a second embodiment of the display system of the invention. This embodiment is substantially the same as the first embodiment except for the addition of a mode selector 50 through which the operator selects a desired one or ones of the indication modes 1 to 19 or eliminates unnecessary one or ones of the indication modes 1 to 19. For example, the mode selector 50 may be used to eliminate the mountain mode when the vehicle is travelling through town area.

Although the invention has been described in connection with indication modes each of which specifies indications of information related to the vehicle to be displayed and scales on which the specified indications are displayed, it is to be understood that the indication modes are designed to specify colors in which the specified indications are displayed.

For easy recognition of the vehicle situation, it is preferable to indicate the vehicle speed meter on the same scale and/or in the same color regardless which one of the indication mode is selected. Furthermore,.it is preferable to intermittently lightening an indication, for each of the specified indications, before the indication is changed.

What is claimed is:

1. A display system for use with an automotive vehicle, comprising:

a display unit having a predetermined area;

sensor means for sensing information related to the automotive vehicle; and a control unit operatively connected to said sensor means and said display unit, the control unit having stored therein a plurality of predetermined indication modes which specify different combinations of scales on which all indicators are displayed within said predetermined area, respectively, the control unit being operative to select based on the sensed information such one of the plurality of predetermined indication modes in which only those indicators which the driver needs or should recognize are displayed in relatively larger scale; and the control unit being operative to cause the display to display all of the indicators in accordance with what is specified by the selected indication mode.

2. A display system for use with an automotive vehicle, comprising:

a display unit having a predetermined area;

sensor means for sensing information related to the automotive vehicle; and a control unit operatively connected to said sensor means and said display unit, the control unit being operative to select one of a plurality of predetermined situations in which the driver of the automotive vehicle is involved based on the sensed information the control unit having stored therein a plurality of predetermined indication modes which specify different combinations of scales on which all indicators are displayed within said predetermined area, respectively, the plurality of predetermined indication modes corresponding to the plurality of predetermined situations in which the driver of the automotive vehicle may be involved such that if one of the plurality of predetermined situations is selected, only those indicators which the driver needs or should recognize in the one selected situation are displayed on larger scale than the other indicators in the corresponding one of the plurality of predetermined indication modes, and the control unit being operative to cause the display to display all of the indicators in accordance with what is specified by the corresponding indication mode to the selected situation in which the driver is involved.

3. A display system as claimed in claim 2, wherein the plurality of predetermined indication modes specify a single scale on which a vehicle speed indicator is displayed.

4. A display system as claimed in claim 3, wherein the control unit is operative to lighten indicators intermittently upon a change from the selected indication mode for a new one.

5. A display system as claimed in claim 2, wherein the control unit is operative to lighten indicators intermittently upon a change from the selected indication mode to a new one.

6. A display system as claimed in claim 2, further comprising means for manually setting at least one of the plurality of predetermined indication modes to be selected.

7. A method of controlling a display unit for an automotive vehicle, the method comprising the steps of:

sensing information related to the automotive vehicle;

selecting one of a plurality of predetermined situations in which the driver of the automotive vehicle is involved based on the sensed information;

providing a plurality of predetermined indication modes which specify different combinations of scales on which all indicators are displayed within said predetermined area, respectively, the plurality of predetermined indication modes corresponding to the plurality of predetermined situations in which the driver of the automotive vehicle may be involved such that if one of the plurality of predetermined situations is selected, only those indicators which the driver needs or should recognize in the one selected situation are displayed on larger scale than the other indicators in the corresponding one of the plurality of predetermined indication modes; and displaying all of the indicators within a predetermined area on the display unit in accordance with what is specified by the corresponding indication mode to the selected situation in which the driver is involved.

8. A method as claimed in claim 7, wherein the plurality of predetermined indication modes specify a single scale on which a vehicle speed indicator is displayed.

9. A method as claimed in claim 8, further comprising the step of lightening indicators intermittently upon a change from the selected indication mode to a new one.

10. A method as claimed in claim 7, further comprising the step of lightening indicators intermittently upon a change from the selected indication mode to a new one.

11. A method as claimed in claim 7, further comprising the step of manually setting at least one of the plurality of predetermined indication modes to be selected.

* * * * *